United States Patent
Frisk

[11] Patent Number: 6,071,626
[45] Date of Patent: Jun. 6, 2000

[54] MULTILAYER, HIGH BARRIER LAMINATE

[75] Inventor: Peter Frisk, Chicago, Ill.

[73] Assignee: Tetra Laval Holdings & Finance, SA, Pully, Switzerland

[21] Appl. No.: 08/756,896

[22] Filed: Dec. 2, 1996

Related U.S. Application Data

[63] Continuation-in-part of application No. 08/642,023, Apr. 29, 1996, Pat. No. 5,830,545.

[51] Int. Cl.[7] ............................. B32B 27/14; B32B 27/32
[52] U.S. Cl. ........................ 428/518; 428/516; 428/34.7; 428/35.2; 428/35.4
[58] Field of Search .................... 428/35.2, 516, 428/34.4, 34.5, 515, 34.7, 35.4, 36.7, 702, 518

[56] References Cited

U.S. PATENT DOCUMENTS

| | | | |
|---|---|---|---|
| 4,359,499 | 11/1982 | Akao et al. | 428/201 |
| 4,452,846 | 6/1984 | Akao | 428/220 |
| 4,536,409 | 8/1985 | Farrell et al. | 428/398 |
| 4,579,781 | 4/1986 | Akao | 428/461 |
| 4,758,462 | 7/1988 | Park et al. | 428/213 |
| 4,778,712 | 10/1988 | Akao | 428/213 |
| 4,981,734 | 1/1991 | Akao et al. | 428/35.9 |
| 4,999,229 | 3/1991 | Moritani et al. | 428/36.6 |
| 5,049,624 | 9/1991 | Adams et al. | 525/371 |
| 5,143,763 | 9/1992 | Yamada et al. | 428/36.2 |
| 5,246,753 | 9/1993 | Koyama et al. | 428/36.7 |
| 5,262,219 | 11/1993 | Yamamoto et al. | 428/141 |
| 5,262,375 | 11/1993 | McKedy | 502/406 |
| 5,350,622 | 9/1994 | Speer et al. | 428/215 |

*Primary Examiner*—Rena L. Dye

[57] ABSTRACT

A high barrier, multilayer laminate is disclosed that is suitable for forming packages that contain oxygen sensitive products. The laminate material has a coextruded multilayer material that includes from exterior to interior: i) an outside sealing and decorative layer, ii) a light barrier layer including an adhesive disposed interior to the outside sealing and decorative layer, iii) a barrier polymer layer disposed interior to the light barrier layer, iv) an oxygen scavenger layer including an adhesive disposed interior to the barrier polymer layer, and v) an inside sealing layer disposed interior to the oxygen scavenger layer. A further laminate structure suitable for forming a package containing an oxygen sensitive product is also disclosed. The further laminate includes a first layer of linear low density polyethylene, a carbon black layer including an adhesive disposed interior to the first layer of linear low density polyethylene; a layer of EVOH disposed interior to the carbon black layer, an oxygen scavenger layer including an adhesive disposed interior to the EVOH layer, and a second layer of linear low density polyethylene disposed interior to the scavenger layer.

3 Claims, 5 Drawing Sheets

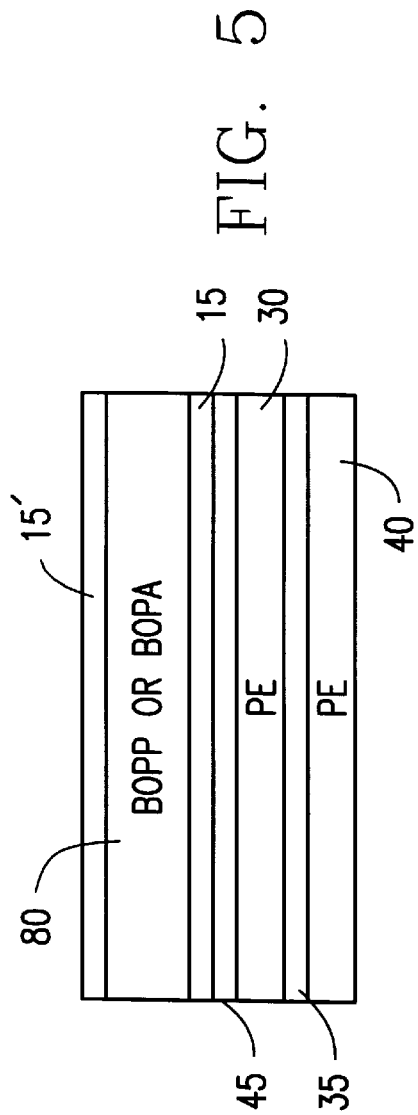
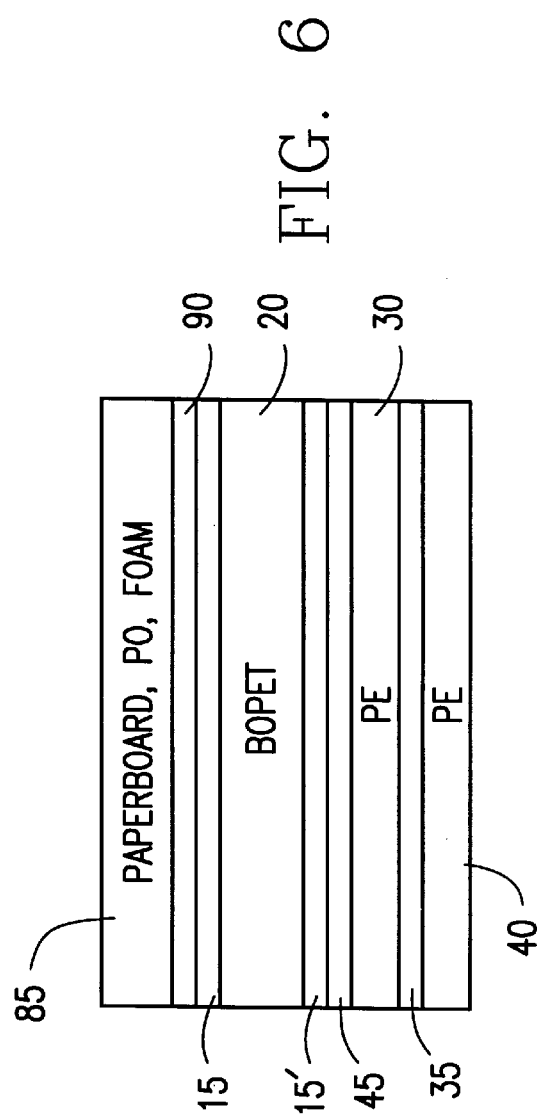

MULTILAYER, HIGH BARRIER LAMINATE

CROSS-REFERENCE TO RELATED APPLICATIONS

This application is a continuation-in-part of U.S. Ser. No. 08/642,023, filed Apr. 29, 1996, now U.S. Pat. No. 5,830,545.

STATEMENT REGARDING FEDERALLY SPONSORED RESEARCH OR DEVELOPMENT

Not Applicable

BACKGROUND OF THE INVENTION

The present invention relates to a multilayer, high barrier laminate material. More specifically, the present invention relates to a multilayer, high barrier laminate material that includes an oxygen scavenging layer, wherein the laminate is particularly suitable for packaging oxygen sensitive products.

Various packaged products are susceptible to degradation due to reactions with oxygen. The packaged products generally come into contact with the oxygen in two primary manners. First, the packaged product may not completely fill the container in which it is disposed thereby leaving a headspace. This headspace typically includes oxygen that may react with the packaged product resulting in the above-noted degradation. Second, the packaged product may come into contact with oxygen that diff-uses through the walls of the package from the ambient atmosphere.

A number of approaches to inhibit exposure of the packaged product to oxygen are known. One such approach includes the provision of an oxygen scavenging sachet in the container. The sachet contains an oxygen scavenging material such as iron, iron oxide, or hydroxide. The oxygen scavenging material reacts with oxygen in the headspace of the container as well as with oxygen that diffuses through the walls of the container.

Another approach relates to modifying the atmosphere within the container to effectively eliminate as much oxygen as possible from the container during the packaging process. This approach, however, neglects the fact that oxygen may permeate through the container walls after the packaging process is complete.

Still another approach relates to the inclusion of an oxygen scavenging material in the walls of the package. Several patents relating to this approach include U.S. Pat. Nos. 5,021,515; 5,049,624; and 5,350,622. The structures disclosed in these patents are often difficult to manufacture.

BRIEF SUMMARY OF THE INVENTION

A high barrier, multilayer laminate is disclosed that is suitable for forming packages that contain oxygen sensitive products. The laminate material, which may be coextruded, comprises a multilayer structure including from exterior to interior: i) an outside sealing and decorative layer, ii) a light barrier layer including an adhesive disposed interior to the outside sealing and decorative layer, iii) a barrier polymer layer disposed interior to the light barrier layer, iv) an oxygen scavenger layer including an adhesive disposed interior to the barrier polymer layer, and (v) an inside sealing layer disposed interior to the oxygen scavenger layer.

Other objects and advantages of the present invention will become apparent upon reference to the accompanying detailed description when taken in conjunction with the following drawings.

BRIEF DESCRIPTION OF THE SEVERAL VIEWS OF THE DRAWING

FIG. 5 is a cross-sectional view of a further embodiment of a laminate suitable for use in forming a package that contains an oxygen sensitive product.

FIG. 6 illustrates application of further layers to the exterior layer of the laminate of FIG. 1.

DETAILED DESCRIPTION OF THE INVENTION

Figure 1:
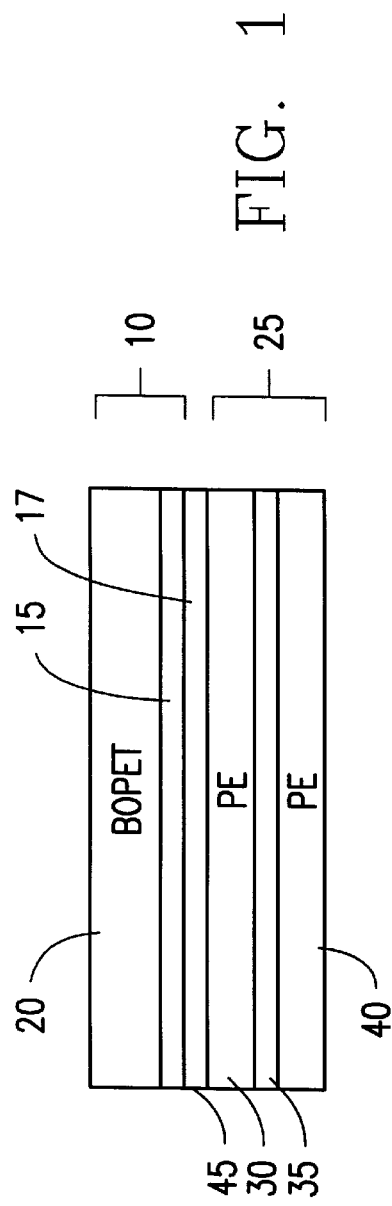
FIG. 1 is a cross-sectional view of one embodiment of a laminate suitable for use in forming a package that contains an oxygen sensitive product.

FIG. 1 illustrates one embodiment of the present laminate. As illustrated, the laminate includes a first multilayer structure 10 of a high barrier oxide layer 15 that is disposed interior to an exterior layer of biaxially oriented polyethylene terephthalate (PET) 20, that, for example, may have a thickness of about ½ mils or 12 microns. The high barrier oxide layer 15 may have, for example, a thickness of several angstroms, depending on such desired attributes as the material stiffness and barrier properties. Alternatively, the high barrier oxide layer may be disposed exterior to the layer of biaxially oriented polyethylene terephthalate, as will be discussed below in connection with other embodiments. Given the light transmitting properties of the layers 15 and 20, the high barrier oxide layer 15 may carry a printed decoration, for example, on surface 17. Alternatively, the printed layer may be disposed on the surface of the layer of biaxially oriented polyethylene terephthalate adjacent the high barrier oxide layer 15.

A second multilayer structure 25 includes an exteriorly disposed polyethylene layer 30, an oxygen scavenging layer 35 disposed interior to the polyethylene layer 30, and a further polyethylene layer 40 disposed interior to the oxygen scavenging layer 35 that, for example, forms the product contact layer. By way of example, the second multilayer structure 25 may have a total thickness of between 50 microns and 100 microns. The first and second multilayer structures 10 and 25 are joined together in a wet or dry lamination process by an adhesive layer 45.

The high barrier oxide layer 15 may be a layer of silicon oxide (SiOx), aluminum oxide (AlOx), or titanium oxide (TiOx). Layer 15 may be deposited, for example, using a plasma-enhanced chemical vapor deposition process or, alternatively, using a liquid phase or gaseous phase photo-chemical vapor deposition process. The layer 15 is, preferably, less than 500 D, and, even more preferably, between 50 D and 100 D.

Figure 2:
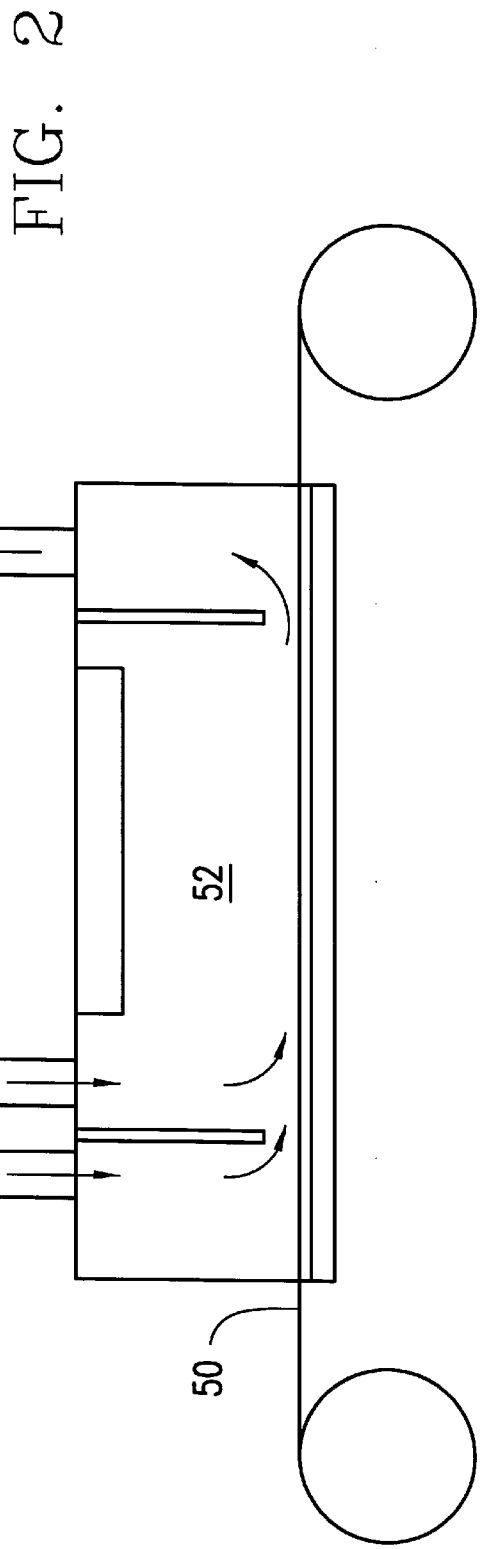
FIG. 2 is a diagram illustrating one embodiment of a system that may be used to apply the high barrier oxide of the laminate of FIG. 1.

An economical apparatus and method for depositing a barrier layer on a substrate material is set forth in U.S. Ser. No. 08/527,414, filed Sep. 13, 1995, which is hereby incorporated by reference. FIG. 2 illustrates one embodiment of the apparatus of that application.

In accordance with the method and apparatus as applied to the present laminate structure, a continuous web of substrate material 50 is provided on which the barrier layer is to be deposited. The web may comprise the BOPET layer 20 alone or in laminated combination with the second multilayer structure 25. The web of substrate material is driven, either continuously or in an indexed fashion, through a reaction chamber 52 of a deposition apparatus 55 wherein there is provided a flow of precursor gas and oxidizer gas. The reaction chamber has an internal pressure of about one atmosphere. The continuous web of substrate material, the precursor gas, and the oxidizer gas are exposed to ultraviolet radiation in the reaction chamber as the continuous web of substrate material is driven therethrough to thereby provide the high barrier oxide layer on the web of substrate material. The method allows a continuous web of substrate material to be continuously processed at a reaction pressure of about one atmosphere thereby making the production of the resulting packaging material more economical than the batch processing at low pressure that is required of the prior processes.

If a barrier layer of SiOx material is desired to be deposited on the web of substrate material, the precursor may be an organic silane such as tetraethoxysilane (TEOS), triethoxysilane, tetraacetoxysilane, or a siloxane such as hexamethyldisiloxane (HMDSO). Other silicon precursors may also be utilized, although organic silanes and organic siloxanes are preferable since they tend to be safer for use in large scale processing. The oxidizing gas may, for example, be an oxidizer such as $N_2O$ or $O_2$. The carrier gas may be an inert gas such as $N_2$, Ar, or He. An aluminum based precursor is chosen if an aluminum oxide barrier is desired.

Various polyethylene materials may be used as the polyethylene material of the second multilayer structure 25. The particular polyethylene chosen is dependent, among other things, on the particular contents that will be enclosed by the packaging material. For example, low density polyethylene is particularly well suited for use as the polyethylene of the second multilayer structure 25 where the packaged contents is a dry product, while linear low density polyethylene is particularly suitable for packaging liquid material. Other suitable polyethylenes include very low density polyethylene, high density polyethylene, ultra low density polyethylene, and metallocenes.

The oxygen scavenger layer 35 comprises, preferably, the same polyethylene material as layers 30 and 40 and is compounded with an oxygen scavenging material in an amount between 0.1% and 99.9% of the total weight of the oxygen scavenger layer 35. The oxygen scavenging material may be selected from one or more materials including: an iron-based material; an organic compound; and/or a biologically active compound. Examples of iron based compounds include FeOx, pure iron, and $Fe_xO_z(OH)_T$. Such iron-based materials allow the oxygen scavenging layer 35 of the disclosed laminate to be humidity activated at a time prior to or concurrent with the filling of a package formed from the laminate. For example, the laminate may be placed in an elevated temperature and humidity environment prior to or concurrent with the filling process for a predetermined time period sufficient to activate the iron-based material. Prior to such time, the laminate may be stored indefinitely in a place of relatively low humidity. A further, iron-based oxygen scavenger material suitable for use in the present laminate is a material known as OXYGUARD which is available from Toyo Seikan Kaisha of Yokohama, Japan.

Various organic materials and compounds are also suitable for use in the oxygen scavenging layer 35, both singly and in combination. For example, ground sea grass and/or ground tea leaves may be suitable for use in the layer 35. A rice extract, such as disclosed in U.S. Pat. No. 5,346,697, may also be utilized.

Monomers and short-chain polymers of, for example, polypropylene and/or polyethylene are likewise suitable. If a short chain polymer is used, selective activation of the oxygen scavenging layer 35 becomes possible by irradiating the laminate with, for example, ultraviolet light or with electron beam emissions. Such irradiation effects a cutting of the inter-monomer bonds thereby creating even shorter, and more chemically active, polymer chains and monomers. If acceleration of the oxygen scavenging process is desirable, the scavenging layer 35 may include both an organic material and an iron-based material.

Figure 3:
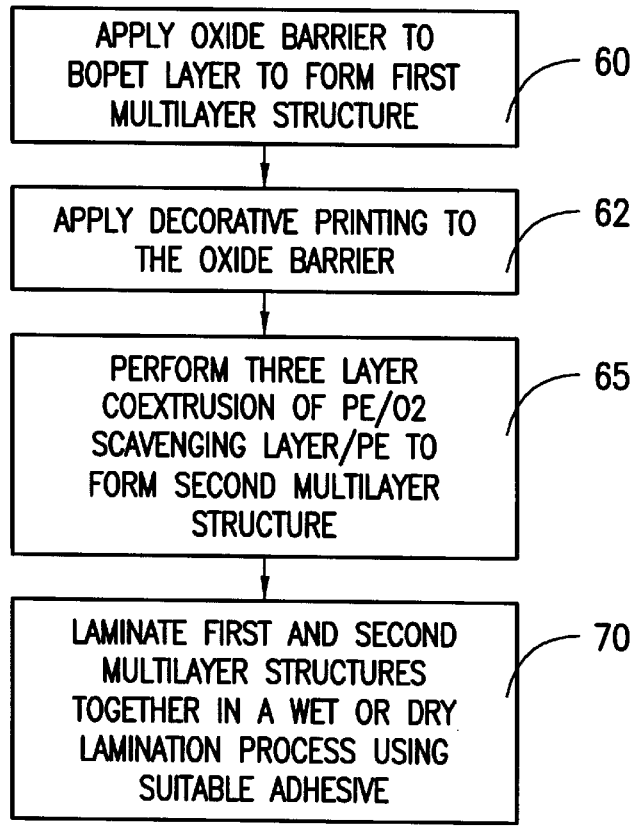
FIGS. 3 and 4 are flow diagrams illustrating embodiments of two preferred methods of manufacturing the laminate of FIG. 1.
Figure 4:
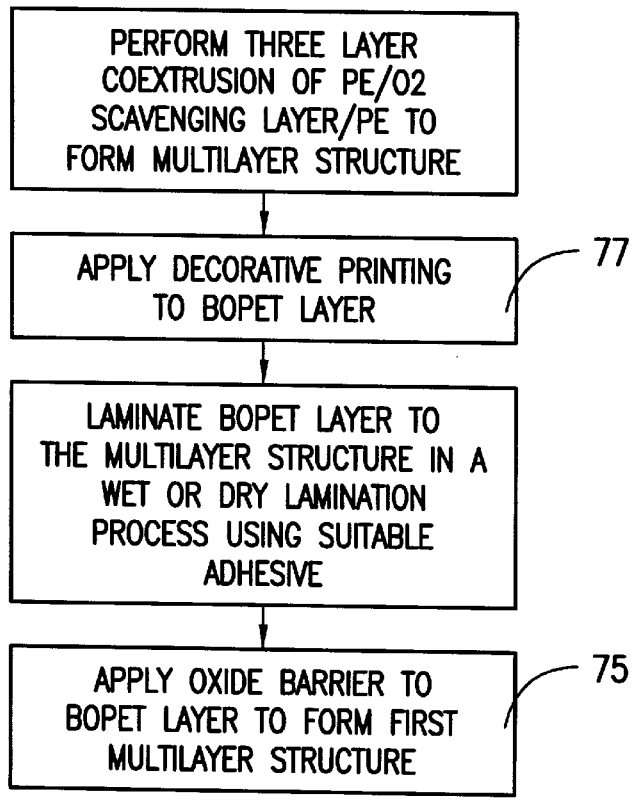

FIGS. 3 and 4 are flow diagrams illustrating embodiments of two methods of manufacturing the laminate of FIG. 1. As illustrated in FIG. 3, the first and second multilayer structures 10 and 25 may be constructed in separate processes. In one of these processes illustrated at step 60, the barrier oxide layer 15 is disposed on the surface of the BOPET layer 20 and an optional printing step 62 is performed to apply a decorative printing layer to the surface of the high barrier oxide layer 15 to thereby form the first multilayer structure 10. In a concurrent or time separated operation illustrated at step 65, the second multilayer structure 25 is formed by performing a three layer coextrusion of the outer PE layer 30, the oxygen scavenger layer 35, and the interior PE layer 40. The first and second multilayer structures 10 and 15 are then laminated together in a wet or dry lamination process illustrated at step 70. Execution of a wet lamination process is preferable. In instances in which a temperature sensitive oxygen scavenging material is used in layer 35. Wet lamination processes can generally be carried out at a lower temperature than dry lamination processes and are thus more applicable to uses in which one or more laminate components contains a temperature sensitive material.

Various adhesives are suitable for joining the first and second multilayer structures 10 and 25. For example, a modified ethylene copolymer or a polyurethane adhesive may be used for this purpose. One polyurethane adhesive suitable for such use is sold under the name NC 253 A with co-reactant CA 3346 by Novacote International of Hamburg, Germany. One example of a modified ethylene copolymer is the anhydride functional LLDPE supplied by DuPont under the trade name of Bynel CXA.

FIG. 4 illustrates a further exemplary embodiment of a method for manufacturing the laminate when the high barrier layer 15 is disposed exterior to the layer of BOPET 20. As illustrated in this example, the oxide barrier 15 is applied at step 75 after the three layer coextrusion has been laminated to the layer of BOPET 20. Additionally, an optional printing step 77 may be used to apply a decoration to the BOPET layer prior to lamination to the second, coextruded multilayer structure. Such printing may also take place after the lamination process, but before the high barrier oxide is applied.

FIG. 5 illustrates a further laminate, similar to the sequence of layers set forth in FIG. 1, except that a layer of biaxially oriented polypropylene or polyamide 80 is utilized in place of the layer of BOPET. The laminate can be manufactured in the manner illustrated in FIGS. 3 and 4, replacing the BOPET layer with the foregoing polypropylene or polyamide layer. The figure also illustrates the possibility of alternatively placing a high barrier oxide layer 15' exterior to the PP layer 80 as opposed to interior thereto.

The laminate structure illustrated in FIG. 1 may be further joined to one or more additional layers at the exterior face of the high barrier oxide layer 15. Such additional layers are illustrated at 85 in FIG. 6 and may comprise, for example, paperboard, polyolefin, and/or foam layers joined to the oxide barrier layer 15. Alternatively, the additional layers may be joined to the BOPET layer 20 where the oxide barrier layer, as illustrated at 15', is disposed interior to the layer 20. The illustrated layers are joined by a suitable adhesive layer 90 in a lamination process. Such layers may likewise be joined to the structure of FIG. 5.

Figure 7:
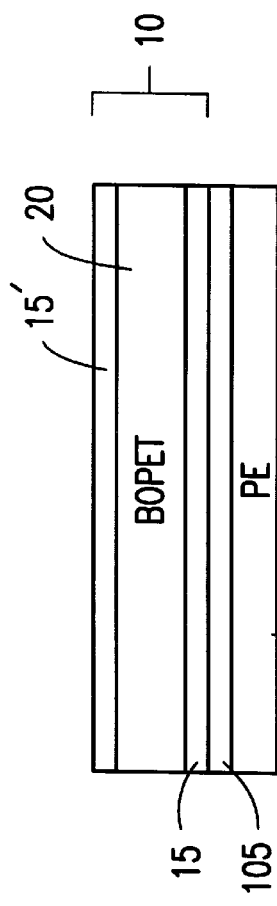
FIG. 7 is a cross-sectional view of a still further embodiment of a laminate suitable for use in forming a package that contains an oxygen sensitive product.

A further laminate structure suitable for packaging oxygen sensitive products is illustrated in FIG. 7. In the illustrated embodiment, a layer of high barrier oxide material 15 (or 15') is disposed on an interior (or exterior) surface of a layer of BOPET 20, or, alternatively, BOPP, or BOPA. The resulting dual layer structure 10 is then laminated, using a wet lamination process, to a layer of PE 100. The PE material may be any one of the previously discussed polyethylene materials. The dual layer structure 10 and the PE layer 100 are joined using a layer of adhesive 105 that includes very fine particulates of an oxygen scavenging material. The oxygen scavenging material can be any one or more of the materials noted above. The diameter of the oxygen scavenging particles is preferably less than 25 microns and, more preferably, less than 3 microns. This structure may also include additional layers, such as those discussed above in connection with FIG. 6.

Figure 8:
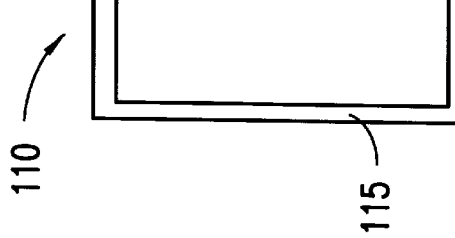

Any of the foregoing laminate structures are suitable for use in forming a pouch, or the like. One example of a pillow-type pouch 110 is illustrated in FIG. 8. When used to form the pouch 110, the laminate is sealed in a back-to-back manner so that the interior layers of PE are joined to one another about at least a portion of a perimeter portion 115. The present pillow pouch may be used to replace traditional structures typically having a structure of PET/adhesive/Al foil/adhesive/LLDPE, since the new laminates are less costly and are easier to manufacture, yet provide a structurally sound pouch that is substantially impervious to oxygen.

Figure 9:
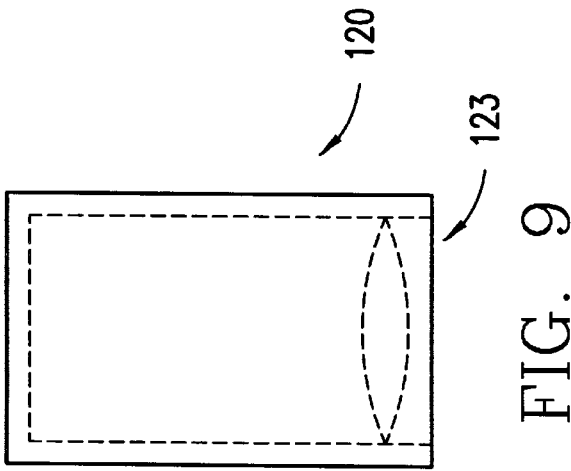
FIGS. 8–10 illustrate various pouches formed from one or more of the foregoing laminate materials.
Figure 10:
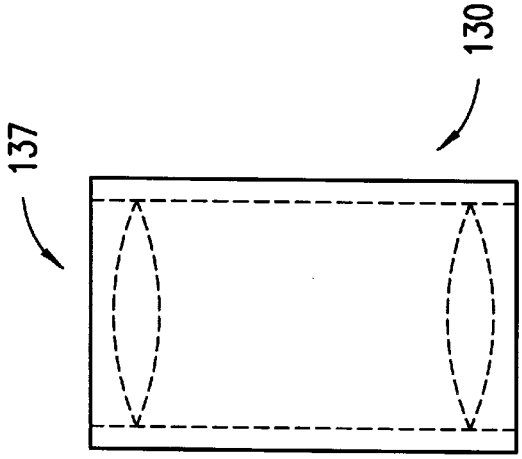

FIG. 9 illustrates a further pouch 120, commonly known as the "Doy-Pak" type pouch. Such a pouch can be manufactured in accordance with the teachings of expired U.S. Pat. No. 3,502,521 and includes a gusseted bottom structure 123 and a flattened top portion 127. FIG. 10 illustrates a pouch 130 including both a gusseted bottom section 133 and a gusseted top section 137. Such pouch structures have a variety of uses.

In systems for ambient temperature distribution of food, it is generally necessary to protect the food from three sources of degradation. These degradation sources include microbiological, oxygen and light. Aseptic systems based on $H_2O_2$ combined with the use of aluminum foil are presently the most cost-effective solutions for dealing with these applications. However, an embodiment of a laminate structure suitable for use in forming a package that contains an oxygen sensitive product is illustrated in FIG. 11.

Figure 11:
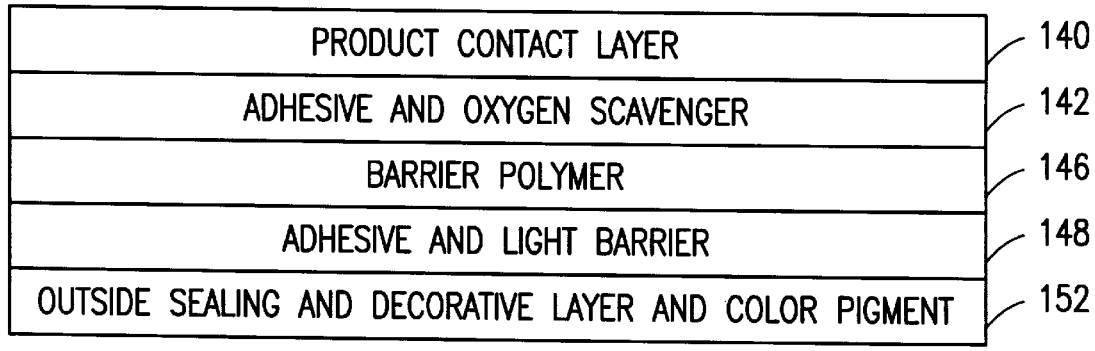
FIG. 11 is a cross-sectional view of yet another embodiment of a laminate suitable for use in forming a package that contains an oxygen sensitive product.

The embodiment illustrated in FIG. 11 provides a material structure which can be used, for example, in forming flexible pouch or extrusion blown molded containers. Coextruded multilayer films, such as the one set forth herein offer a cost-effective way to produce materials that are heat-sealable and exhibit high barrier properties. Traditionally, the barrier performance and the cost of these films have not been competitive with aluminum foil because even the best barrier polymers do not function as an absolute barrier like aluminum foil. However, the addition of a light barrier layer and an oxygen scavenger layer makes the embodiment illustrated in FIG. 11 quite cost competitive with aluminum foil in the above-described applications while still providing high barrier properties.

FIG. 11 illustrates an embodiment of the laminate having multiple layers. The layers may all be coextruded. For example, a product contact layer 140 comprising a heat-sealable polymer is provided in the material structure. An adhesive and an oxygen scavenger are combined in a scavenger layer 142 located exterior to the product contact layer 140. In addition, a barrier polymer layer 146 is located exterior to the scavenger layer 142. An adhesive and a light barrier material are located in a layer 148 disposed exterior to the barrier polymer layer 146. Finally, an outside sealing and decorative layer 152, which, for example, may include a color pigment, is located exterior to the light barrier layer 148. The outside sealing and decorative layer 152 is located at the outside of the material structure.

Several different oxygen scavenging materials may be used in the oxygen scavenger layer 142. One such material is an ABPA additive available from Amoco. Another preferred oxygen scavenger material is AMOSORB available from Amoco. A typical amount of such an oxygen scavenger needed in the layer 142 to ensure the same barrier performance as aluminum foil for up to one year is typically 0.1–1 $g/m^2$. Humidity is the trigger mechanism for such oxygen scavengers and makes it particularly suitable for containers for liquid foods. In addition, the barrier polymer layer 146 may also contain some $CaCO_3$ mineral filler to reduce the cost.

Figure 12:
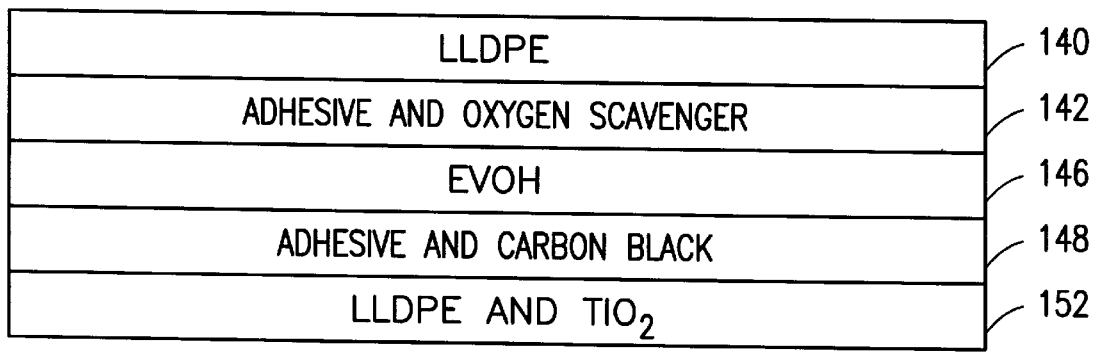
FIG. 12 is a cross-sectional view of an exemplary embodiment of a laminate suitable for use in forming a package that contains an oxygen sensitive product.

FIG. 12 illustrates a further embodiment of the invention based on the structure of FIG. 11. In this embodiment, the product contact layer 140 is formed from LLDPE. The barrier layer 146 is formed from EVOH. In addition, the light barrier layer 148 includes carbon black. Finally, the outside sealing and decorative layer 152 is formed from LLDPE and includes $TiO_2$ as the color pigment.

Although the present invention has been described with reference to a specific embodiment, those of skill in the art will recognize that changes may be made thereto without departing from the scope and spirit of the invention as set forth in the appended claims.

I claim:

1. A laminate material comprising:
    a product contact layer composed of a linear low density polyethylene;
    a first adhesive layer disposed on the product contact layer, the second layer composed of an adhesive and a plurality of oxygen scavenger particles, each particle having a diameter less than 25 microns;
    a barrier layer composed of EVOH, the barrier layer disposed on the second layer;
    a second adhesive layer disposed on the barrier layer, the second adhesive layer composed of an adhesive and carbon black; and
    a sealing layer disposed on the second adhesive layer, the sealing layer composed of a linear low density polyethylene and $TiO_2$.

2. The laminate material according to claim 1 wherein the oxygen scavenger particles are composed of a material selected from the group consisting of an iron-based material, an organic compound and a biologically active compound.

3. The laminate material according to claim 2 wherein the iron-based material is selected from the group consisting of $FeO_x$, $FE$, $Fe_yO_z(OH)_T$.

* * * * *